United States Patent
Cetoli et al.

(10) Patent No.: US 12,406,008 B1
(45) Date of Patent: *Sep. 2, 2025

(54) USING INTENT-BASED RANKINGS TO GENERATE LARGE LANGUAGE MODEL RESPONSES

(71) Applicant: Citibank, N.A., New York, NY (US)

(72) Inventors: Alberto Cetoli, London (GB); Jason Ryan Engelbrecht, London (GB); Youval Bitner, New York, NY (US); Joel Branch, New York, NY (US); John E. Ortega, New York, NY (US)

(73) Assignee: CITIBANK, N.A.

( * ) Notice: Subject to any disclaimer, the term of this patent is extended or adjusted under 35 U.S.C. 154(b) by 0 days.

This patent is subject to a terminal disclaimer.

(21) Appl. No.: 19/023,025

(22) Filed: Jan. 15, 2025

Related U.S. Application Data (63) Continuation of application No. 18/922,212, filed on Oct. 21, 2024, now Pat. No. 12,222,992.

(51) Int. Cl.
*G06F 16/906* (2019.01)
*G06F 16/93* (2019.01)

(52) U.S. Cl.
CPC ............ *G06F 16/906* (2019.01); *G06F 16/93* (2019.01)

(58) Field of Classification Search
CPC ............................... G06F 16/906; G06F 16/93
See application file for complete search history.

(56) References Cited

U.S. PATENT DOCUMENTS

| | | |
|---|---|---|
| 11,228,505 B1 | 1/2022 | Wang et al. |
| 12,079,570 B1 | 9/2024 | Mondlock et al. |
| 12,175,354 B1 | 12/2024 | Dehghanpoor et al. |
| 2021/0174161 A1 | 6/2021 | Perez et al. |
| 2022/0237230 A1 | 7/2022 | Zovic et al. |
| 2022/0274625 A1 | 9/2022 | Garimella et al. |
| 2022/0374459 A1 | 11/2022 | Liu et al. |
| 2024/0013562 A1 | 1/2024 | Montero et al. |
| 2024/0097920 A1 | 3/2024 | Robertson et al. |
| 2024/0403341 A1 | 12/2024 | Berglund et al. |
| 2024/0403564 A1 | 12/2024 | Bendersky et al. |
| 2024/0419699 A1 | 12/2024 | Avny Brosh et al. |
| 2025/0005293 A1 | 1/2025 | Nguyen et al. |
| 2025/0005296 A1 | 1/2025 | Goswami et al. |
| 2025/0013788 A1 | 1/2025 | Chen et al. |
| 2025/0014653 A1 | 1/2025 | Zhou et al. |

*Primary Examiner* — Hau H Hoang
(74) *Attorney, Agent, or Firm* — Perkins Coie LLP (57) ABSTRACT

The systems and methods disclosed herein generates responses generated by artificial intelligence (AI) models such as large language models (LLM) using intent-based rankings of retrieved information. The systems and methods disclosed herein receives an output generation request for the generation of an output using a set of AI models. Using a first AI model, a set of documents are retrieved using the received output generation request. The set of documents are partitioned into chunks. The chunks are ranked using a distance between the vector representation of the received output generation request and the vector representation of each chunk. A second AI model classifies the output generation request and chunks using an intent of the respective output generation request or chunk, and generates a second set of rankings using the intents. The set of AI models generate a response using the second set of rankings.

20 Claims, 6 Drawing Sheets

FIG. 1

| User Query 102 | Semantic Similarity Ranking 202 | Intent 208 | Immunity Factor 210 | Intent Ranking 204 |
|---|---|---|---|---|
| Document A | 1 | X | Yes | 1 |
| Document B | 2 | Y | No | 3 |
| Document C | 3 | Z | No | 2 |

USING INTENT-BASED RANKINGS TO GENERATE LARGE LANGUAGE MODEL RESPONSES

CROSS-REFERENCE TO RELATED APPLICATION

This application is a continuation of U.S. patent application Ser. No. 18/922,212 filed on Oct. 21, 2024, entitled "USING INTENT-BASED RANKINGS TO GENERATE LARGE LANGUAGE MODEL RESPONSES", which is hereby incorporated by reference in its entirety.

BACKGROUND

Artificial intelligence (AI) models often operate based on extensive and enormous training models. The models include a multiplicity of inputs and how each should be handled. When the model receives a new input, the model produces an output based on patterns determined from the data the model was trained on. A large language model (LLM) is a language model notable for its ability to achieve general-purpose language generation and other natural language processing tasks such as classification. LLMs can be used for text generation, a form of generative AI (e.g., GenAI, Gen AI, or GAI), by taking an input text and repeatedly predicting the next token or word. LLMs acquire these abilities by learning statistical relationships from text documents during a computationally intensive self-supervised and semi-supervised training process. Generative AI models, such as LLMs, are increasing in use and applicability over time.

An example natural language processing task, information retrieval (IR), can be used to generate responses of LLMs. IR is the task of identifying and retrieving information system resources that are relevant to (e.g., most likely to pertain to) an information need. The information to be retrieved can be specified in the form of a search query (e.g., user query). In the case of document retrieval, queries can be based on full-text or other content-based indexing. Information retrieval can include searching for information in a document, searching for documents themselves, and/or searching for the metadata that describes data.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Due to the inherent complexity and opacity of large language models (LLMs) used in generative artificial intelligence techniques within the natural language processing (NLP) field, it becomes exceedingly difficult to understand and interpret the responses produced by the LLMs. LLMs are characterized by their extreme size, often comprising billions or more parameters. The complexity renders LLMs as "black boxes," which obscures the underlying mechanisms and decision-making processes, leading to responses that may be difficult to validate or interpret without additional transformations/filters. Thus, the responses originally output from the LLM may need further transformations into valid and reliable outputs that meet the expectations of users (e.g., subject matter experts).

One of the paradigms from NLP that can be used to generate a valid response is information retrieval (IR). IR identifies sections or chunks (e.g., of text) from the documents that are most likely pertain to the original response generated by the LLM. However, conventional IR methods struggle to accurately rank the documents to produce a valid response. Conventional IR methods and systems often rely on linear ranking methods, where documents are compared to the query based on a single metric such as semantic similarity, and ranked in descending order. While conventional approaches identify and rank chunks of text that are closely related to the query based on vector calculations, conventional IR methods and systems often struggle to grasp the intent behind a user's search query, leading to the retrieval of documents that may be relevant in a general sense but do not precisely match the user's specific needs. For example, in response to a query such as "How do I reset my password?," the conventional approach may return documents that mention passwords in various contexts, such as password policies, password strength recommendations, or general security tips, but fail to provide specific steps needed to reset a password.

Additionally, conventional IR methods and systems often rely heavily on keyword matching, which can lead to the retrieval of documents that contain the same keywords but lack the appropriate context. Keyword matching identifies and retrieves documents that contain specific words or phrases from a user's query by ranking documents based on the frequency and location of the specific words or phrases, with the assumption that documents containing more occurrences of the keywords, or those where the keywords appear in prominent positions (e.g., titles or headings), are more relevant to the query. However, keyword matching can be particularly problematic in cases where the same keywords can have different meanings in different contexts. For example, a keyword "bank" could potentially refer to a financial institution, the side of a river, or a verb meaning to tilt or incline. A conventional IR system that relies solely on keyword matching may retrieve documents related to all of the contexts, making it difficult for the user to find the specific information they are looking for. Further, in the digital age, users are already inundated with vast amounts of data, making it difficult to sift through and find the most relevant information. Conventional IR methods and systems can exacerbate this problem by returning a large number of results, many of which may be only tangentially related to the query.

Attempting to create a system to generate valid and reliable AI model (e.g., LLM) responses in view of the available conventional approaches created significant technological uncertainty. Creating such system required addressing several unknowns in conventional approaches in IR, such as how to determine the intent of a query accurately and how to integrate the intent of the query into the IR process. LLMs, while powerful in generating human-like text, often produce responses based on patterns learned from vast amounts of data without identifying the specific intent behind a query.

Unlike keyword matching, which simply looks for the presence of specific words, intent-based rankings identify the context and purpose behind the query. For example, the intent can differ based on factors such as the user's search history, the context in which the query was made, and the specific information needs implied by the query. However, determining the intent of a query accurately created technological uncertainty due to the inherent complexity and ambiguity of natural language. Users often express their queries in various ways, using different words, phrases, and structures, which can lead to multiple interpretations. For example, a query such as "best practices for remote work" can imply a need for productivity tips, tools, or legal guidelines. Additionally, integrating the intent of the query into the IR created technological uncertainty due to the conventional IR approaches that did not allow for dynamically adjusting the ranking of documents based on the intent of the query. Furthermore, generating AI model responses using intent-based rankings created further technological uncertainty due to multi-faceted queries that included multiple intents.

To overcome the technological uncertainties, the inventors systematically evaluated multiple design alternatives. For example, the inventors tested various NLP techniques to generate valid and reliable LLM responses. One alternative tested included keyword expansion methods, where synonyms and related terms were added to the query to capture a broader range of relevant documents. However, this approach often led to an overload of results, many of which were still irrelevant due to the lack of contextual understanding. Another design alternative was to implement rule-based systems that relied on predefined patterns and heuristics to filter and rank documents. However, rule-based systems were limited by its rigidity and inability to adapt to the dynamic and evolving nature of language, and continuously updating the rules proved to be tedious and inefficient. The inventors also experimented with basic term frequency-inverse document frequency (TF-IDF) models to weigh the importance of particular words in documents. Although the models reduced noise, the models still struggled with capturing the semantic relationships between words, leading to suboptimal relevance in the retrieved documents.

Thus, the inventors experimented with different methods for generate valid LLM responses reflective of a user's intent by identifying the query's intent and ranking the documents accordingly. For example, the inventors tested various rule-based systems and machine learning models that automatically classify the intent of not only the query, but the documents themselves. Further, the inventors expanded the IR process into a multi-stage process that can initially begin with a semantic similarity ranking to identify the contextual relationships between the user's query and documents (e.g., based on distance between vector representations of the user's query and documents), and then subsequently followed by an intent-based re-ranking that can prioritize the initial semantic similarity ranking (e.g., a re-ranking) based on a classified intent of the user's query and documents.

As such, the inventors have developed a system for generating AI model (e.g., LLM) responses using intent-based rankings (hereinafter the "intent-based data generation platform"). The intent-based data generation platform receives an output generation request (e.g., a user query) from a computing device. A model (e.g., embedding model, non-generative model, generative model, LLM, AI model) retrieves a set of documents responsive to the prompt and partitions these documents into chunks (or receives the pre-chunked documents). The model generates a first set of rankings for the chunks by creating vector representations of both the output generation request and each chunk. For each chunk, a distance metric value can be determined between its vector representation and that of the request, and the value is used to assign a ranking. Next, a model of the set of models (same or different model) classifies the output generation request and each chunk with categorical labels (e.g., intent) that indicate attributes of the expected output. In some implementations, the classification can be performed at the document level, allowing each chunk to "inherit" the label from the document the chunk is taken from. For instance, if a document is labeled with the intent "password reset steps," all chunks extracted from this document can inherit the label.

The model generates a second set of rankings for the chunks based on the categorical labels, ranking chunks with matching labels higher than those without matching labels. The order within the matching labels and the non-matching labels groupings are determined by the original semantic similarity metric. Thus, even among the chunks with matching labels, those that are more semantically similar to the user's query are ranked higher. Conversely, in the group of non-matching labels, the chunks are also ordered by the chunks' semantic similarity, though ranked lower overall compared to the matching group.

Using this second set of rankings (e.g., re-ranked documents) and the information in the retrieved documents, the models generate a response to the output generation request. In some implementations, the top N chunks, where N is a predefined value, are used by the LLM to generate the response. In some implementations, if certain chunks satisfy predefined criteria, an immunity factor is applied to prevent their ranking from dropping in the second set of rankings compared to the first set. Furthermore, chunks can be classified with multiple categorical labels, and their rankings can be generated using a weighted sum of the labels.

Unlike conventional approaches that rely solely on semantic similarity rankings or keyword matching, the disclosed systems and methods can dynamically integrate both semantic understanding and intent by employing a multi-stage process. For example, in response to a query such as "How do I reset my password?", the intent-based data generation platform not only retrieves documents mentioning passwords but also prioritizes documents that specifically provide step-by-step instructions for resetting a password. The dual-layered approach can filter out/de-prioritize irrelevant information, such as password policies or general security tips, which conventional IR methods may erroneously rank highly due to keyword matching. Additionally, the intent-based data generation platform mitigates the issue of polysemy, where the same keyword can have different meanings in different contexts since the retrieved documents are relevant to the specific context of the query. Further, by including an immunity factor to prevent certain documents from moving ranks between stages (i.e., the initial semantic similarity ranking and the subsequent intent-based ranking), the intent-based data generation platform is able to preserve the flexibility of returning documents that satisfy predetermined criteria (e.g., policy documents, high importance documents).

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed intent-based data generation platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Implementations of an Intent-Based Data Generation Platform

Figure 1:
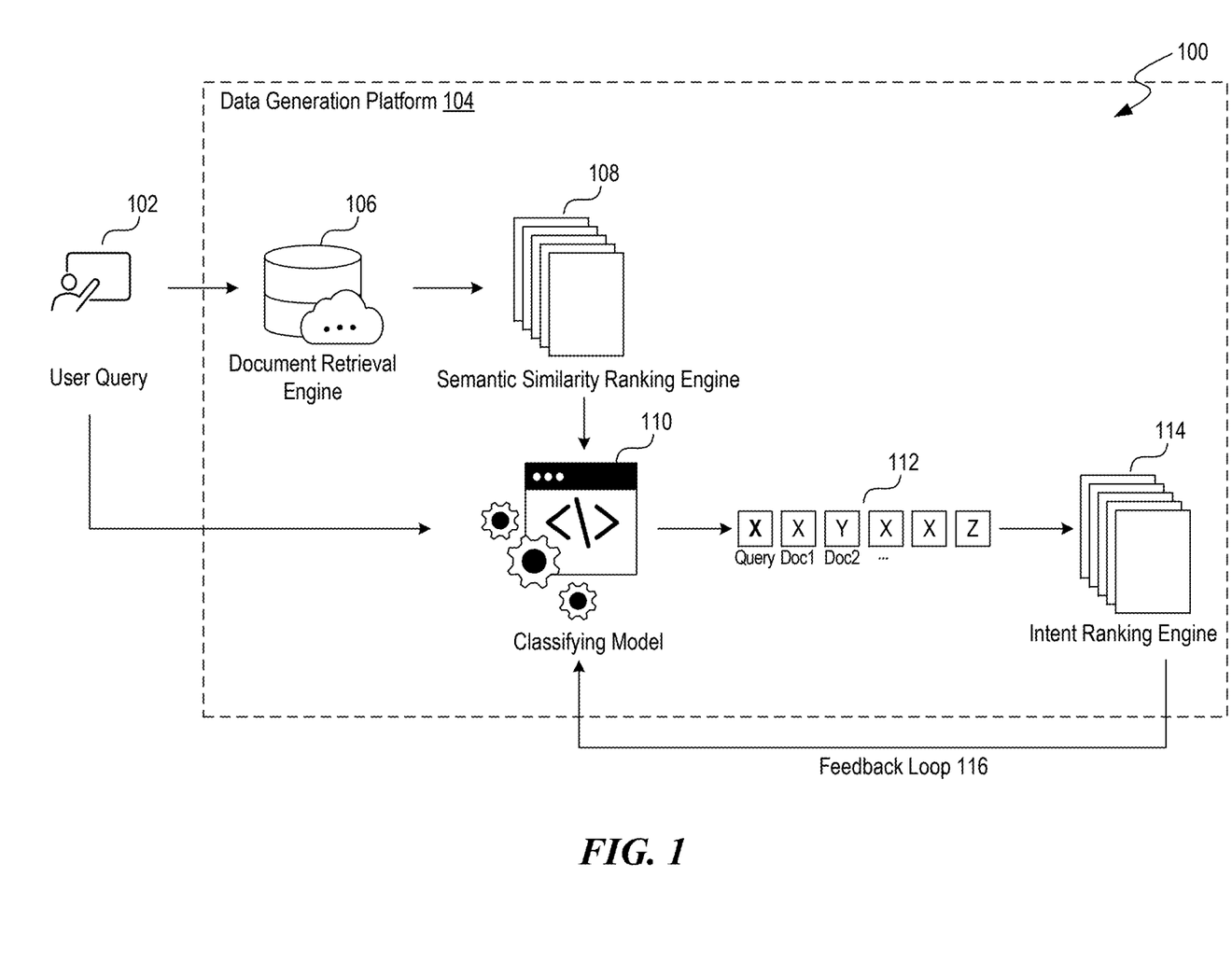
FIG. 1 is an illustrative diagram depicting an example environment of an intent-based data generation platform for ranking retrieved information of models by intent, in accordance with some implementations of the present technology.

FIG. 1 is an illustrative diagram illustrating an example environment 100 of an intent-based data generation platform 104 for ranking retrieved information of models by intent, in accordance with some implementations of the present technology. Environment 100 includes user query 102, intent-based data generation platform 104, document retrieval engine 106, semantic similarity ranking engine 108, classifying model 110, classified information 112, intent ranking engine 114, and feedback loop 116. Implementations of example environment 100 can include different and/or additional components or can be connected in different ways.

The user query 102 (e.g., an output generation request, search query, input query, user request) can be the initial input provided by a user seeking information (e.g., an output) from the intent-based data generation platform 104 (e.g., an LLM, an AI model, a generative AI model). The user query 102 can be in the form of, for example, natural language text, images, videos, audio files, and so forth. For example, a user can input "How do I reset my password?" as the user query 102. The user query 102 is used by the intent-based data generation platform 104 to retrieve relevant documents and information (e.g., where relevance is measured by the priority of the document/information in intent ranking engine 114). Methods of intaking different modalities of user queries 102 (e.g., natural language text, images, videos, audio files) and/or multi-modality user queries 102 by the intent-based data generation platform 104 are discussed with reference to FIG. 3. The intent-based data generation platform 104 (e.g., information retrieval system, query processing engine, search platform) can integrate multiple functionalities, such as document retrieval engine 106 and classifying model 110, to deliver relevant and contextually appropriate information in response to the user query 102. Intent-based data generation platform 104 is implemented using components of example devices 500 illustrated and described in more detail with reference to FIG. 5. For instance, upon receiving the query "How do I reset my password?", the intent-based data generation platform 104 can perform and/or facilitate the retrieval of documents related to password reset procedures, rank the documents based on semantic similarity, and classify/re-rank the documents according to their intent using methods discussed in further detail with reference to FIG. 3.

Document retrieval engine 106 (e.g., information retrieval, search retrieval, document fetching) is an engine within intent-based data generation platform 104 that identifies and retrieves documents relevant to the user query 102 from a datastore. Document retrieval engine 106 can use one or more search algorithms and indexing techniques to scan through large datasets in the datastore and retrieve documents using the user query 102 based on, for example, keywords within the user query 102 and/or context of the user query 102. For example, document retrieval engine 106 can use inverted indexing and TF-IDF to rank documents based on their relevance to the user query 102 by identifying and indexing the terms within the user query 102 and the documents. Examples of inverted indexing and TF-IDF and further methods of document retrieval engine 106 are discussed with reference to FIG. 3.

The retrieved documents by document retrieval engine 106 can be subsequently passed on to the semantic similarity ranking engine 108 to be ranked based on their semantic content. Semantic similarity ranking engine 108 (e.g., contextual ranking, relevance ranking, semantic analysis) determines the retrieved documents' relevance to the user query 102 based on semantic content rather than, for example, simply keyword matching. Semantic similarity ranking engine 108 can, for example, assess the contextual similarity between the user query 102 and the retrieved documents to identify the context of the query and the documents (e.g., using word embeddings, sentence embeddings, transformer models), ensuring that documents discussing "password reset steps" are ranked higher for the query "How do I reset my password?" By doing so, semantic similarity ranking engine 108 ensures that the more contextually relevant documents are prioritized, which improves the overall accuracy and usefulness of the information provided to the user. Methods of semantic similarity ranking (e.g., vector distance metrics) are discussed with reference to FIG. 3.

The classifying model 110 (e.g., categorization model, topic classifier, content classifier) can be one or more models that classify retrieved documents from document retrieval engine 106 and user query 102 into predefined categories or topics based on one or more classifications such as intent. Classifying model 110 is the same as or similar to AI system 400 illustrated and described in more detail with reference to FIG. 3. For example, using the password example above, the classifying model 110 can classify documents into categories such as "password reset steps," "password policies," and/or "security tips." The classified information 112 can be used to further refine the ranking and presentation of the information to the user. Classified information 112 (e.g., categorized data, labeled information, organized content) represents the output of the classifying model 110, where the retrieved documents have been categorized and labeled based on their intent. This classified information 112 provides a structured and organized dataset that can be further analyzed and ranked based on the classifications assigned. For instance, documents classified under "password reset steps" can be ranked higher for a query focused on resetting a password due to the higher degree of alignment to the classification of the user query 102. The degree of alignment can measure how closely the content of a document matches the specific intent of the user's query 102.

Intent ranking engine 114 ranks the classified information 112 based on the inferred intent of the user query 102. Intent ranking engine 114 ensures that the information presented to the user is not only relevant semantically but also aligned with the user's underlying intent, providing a more personalized information retrieval. Intent, in the context of information retrieval and NLP, can refer to the underlying purpose or goal behind a user's query 102 or input and/or the retrieved documents, and encapsulate the user's desired outcome and/or the specific information the user is seeking to obtain. In some implementations, intent can be separated into one or more categories/classifications. For example, informational intent can refer to queries where the user seeks specific information or answers to questions (e.g., looking for factual data, explanations, procedural guidance). For example, a user query such as "What are the latest regulations on insider trading?" indicates that the user is seeking information about regulatory changes. On the other hand, navigational intent includes queries where the user aims to locate a specific location, such as a website or page. Navigational intent can be characterized by the user's knowledge of what they are looking for and their desire to navigate directly to it. For example, "Company X Firm Manual," can indicate that the user desires to access a particular section of a company's website. Transactional intent encompasses queries where the user intends to perform a specific action (e.g., making a purchase, booking a service, completing a task). For example, "Open a bank account," can indicate that the user is ready to engage in a transaction or initiate a service. Investigation intent can include queries where the user is researching products or services (e.g., with the intention of making a purchase decision). Investigation intent can be characterized by the user's need to gather information to inform their decision-making process. For example, "Best financial software for small businesses" can be categorized under investigation intent where the user is evaluating options before making a commitment. One of skill in the art would understand that the disclosed categories of intent is non-limiting, and would understand that the disclosed techniques performed by the intent-based data generation platform 104 described herein can apply to other types of intent.

The feedback loop 116 collects feedback from, for example, users, regarding the degree of adequacy/performance of the retrieved and ranked information. For instance, if a user frequently selects documents related to "password reset steps" after querying "How do I reset my password?", the feedback can be used to adjust future semantic similarity rankings and/or intent rankings by, for example, assigning additional weight to the documents related to "password reset steps" to ensure that documents related to "password reset steps" are prioritized and appear higher in the search results for similar queries. Methods of using feedback loop 116 to adjust future semantic similarity rankings and/or intent rankings are discussed in further detail with reference to FIG. 3.

In some implementations, the LLM is multimodal. When a user submits a user query 102 accompanied by images, the LLM can extract visual features of the images using convolutional neural networks (CNNs) or other image processing methods. For example, if a user asks, "How do I reset my password?" and includes a screenshot of the password reset page, the CNN can identify visual elements such as text fields, buttons, and instructional text. The CNN can apply a series of convolutional layers, pooling layers, and activation functions to the image, to transform the image into a feature map that captures the visual elements. In some implementations, the intent-based data generation platform 104 aligns textual tokens extracted from the text of the user query 102 with the corresponding visual features. The intent-based data generation platform 104 can assign higher relevance scores to intents that align to both the textual and visual context. For example, intents related to "password reset steps" can be prioritized over less relevant intents like "password policies" or "security tips" due to the attached image containing the password reset steps.

Figure 2:
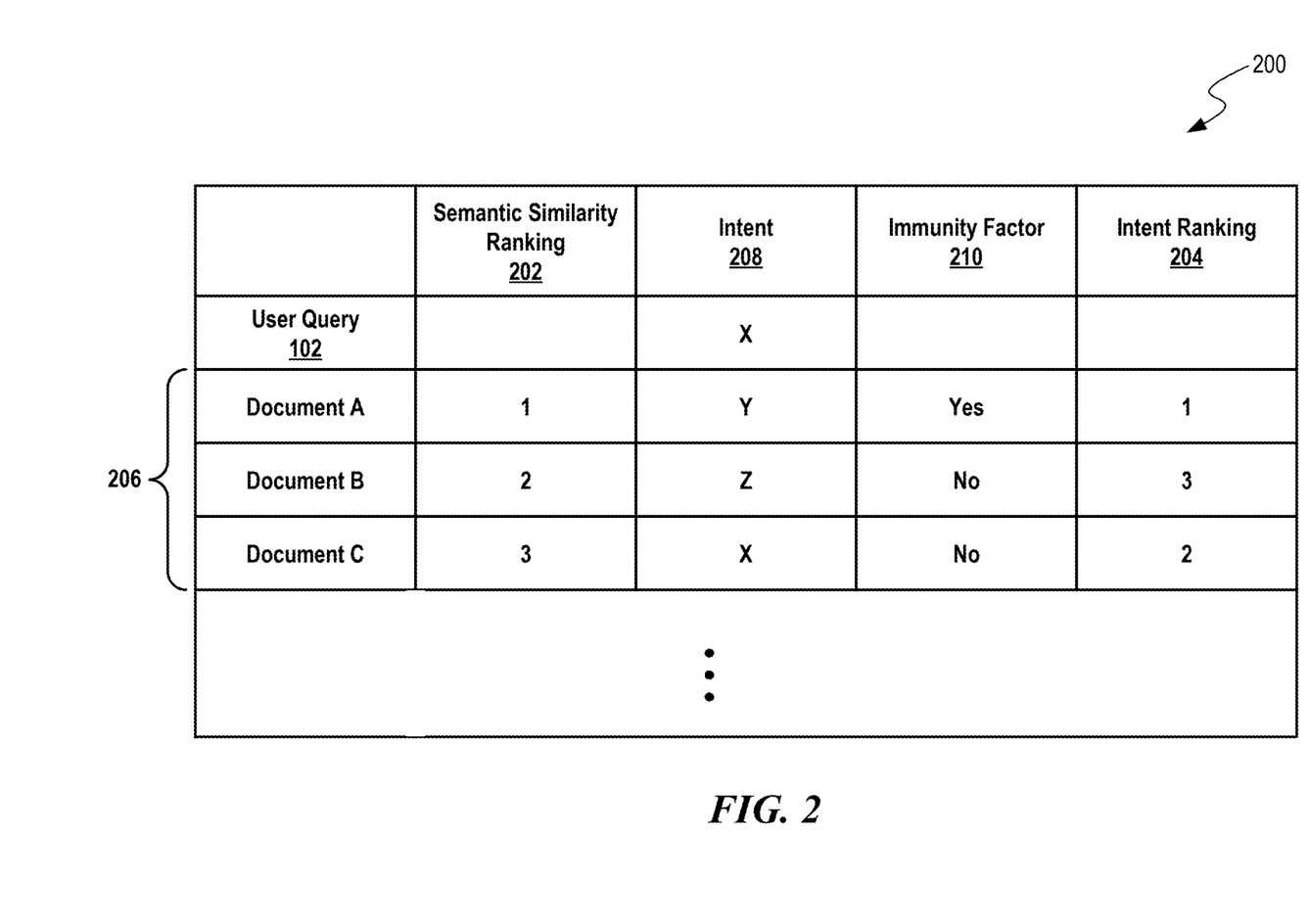
FIG. 2 is an illustrative diagram depicting an example environment of a set of retrieved documents ranked by intent, in accordance with some implementations of the present technology.

FIG. 2 is an illustrative diagram illustrating an example environment 200 of a set of retrieved documents ranked by intent, in accordance with some implementations of the present technology. Environment 200 includes user query 102, semantic similarity ranking 202 (e.g., from semantic similarity ranking engine 108), intent ranking 204 (e.g., from intent ranking engine 114), documents 206, intent 208 (e.g., from classifying model 110), and immunity factor 210. Implementations of example environment 200 can include different and/or additional components or can be connected in different ways.

The documents 206 refer to the set of documents retrieved by document retrieval engine 106 in response to the user query 102. The documents 206 can be initially ranked based on their semantic similarity to the query by the semantic similarity ranking 202. For example, if the user query 102 is "How do I reset my password?", documents 206 can include, for example, various articles, guides, and/or frequently asked questions related to password management. For example, document A 206 can discuss organizational guidelines for passwords, document B 206 can cover unrelated password topics, and document C 206 can provide specific steps for resetting a password. The initial ranking based on semantic similarity does not consider the specific intent behind the query, which is subsequently addressed by the intent ranking 204.

Intent 208 refers to the classification of both the user query 102 and each document 206 based on their underlying intent. Examples of intent are discussed in further detail with reference to FIG. 1. The classification can be performed by the classifying model 110 in FIG. 1 to assign categorical labels indicating the intent. For instance, the query "How do I reset my password?" can be classified with the intent "password reset." Similarly, document C 206, which provides specific steps for resetting a password, can be classified with the same intent. Document A 206, which discusses organizational guidelines for passwords, can be classified with a separate intent "password policy," and document B 206, which covers unrelated password topics, can be classified with yet another separate intent "general password information." The intent ranking engine 114 in FIG. 1 can reorder the documents based on a measure of how much the document's intents 208 match the intent 208 of the user query 102. For example, in FIG. 2, document B 206 is ranked second in the semantic similarity ranking 202 but third in the intent ranking 204 because the document's intent does not align as closely with the query's intent as document C 206 does.

The immunity factor 210 ensures certain documents maintain a high ranking despite their intent classification. The immunity factor 210 can be applied to documents that satisfy predefined criteria, such as being highly authoritative or frequently accessed. For example, even if document A 206 has an intent 208 of "password policy" rather than "password reset," document A 206 can still be ranked first in the intent ranking 204 due to the immunity factor 210. The immunity factor 210 prevents the ranking of such documents from being lower than their ranking in the semantic similarity ranking 202. The immunity factor 210 ensures that documents which may not match the query's intent but are still highly relevant or authoritative (e.g., from an organizational or regulatory perspective), remain easily accessible to the user and taken into account when generating a response to the user query 102.

In some implementations, the immunity factor ensures that documents that are ranked high in terms of semantic similarity, but do not share the same label as the query maintain the high ranking. For example, the immunity factor can ensure that certain documents maintain a high ranking due to their authoritative nature, regardless of their intent classification. For example, a document from a regulatory body can always rank highly because of its inherent importance. In some implementations, the immunity factor can be applied to documents that are frequently accessed or have high user engagement to ensure that popular or commonly referenced documents remain prominent in search results. Additionally, in some implementations, the immunity factor can prioritize documents that are associated with compliance or organizational guidelines to ensure that policy documents are easily accessible even if the documents do not match the user's query intent. Furthermore, in some implementations, the immunity factor can be used to maintain the visibility of documents that have been manually flagged by administrators and/or users to ensure that important resources are always readily available to users. In some implementations, the immunity factor can allow the rank of certain documents to change but limits the extent of the change. For instance, an authoritative document can be allowed to move down in the rankings, but only by a limited or predefined number of positions to ensure that the document remains near the top of the search results. In some implementations, the predefined number of positions can be determined in the context of the total number of retrieved documents (e.g., cannot be within the lower fifty percentile of the rankings), or can be static (e.g., cannot be within the lower fifty documents ranked).

The immunity factor can be further be dynamically adjusted based on user feedback and interaction metrics to enable the intent-based data generation platform 104 to adaptively maintain the prominence of important documents while still responding to evolving user preferences. Additionally, the immunity factor can be applied selectively based on the context of the user query 102, such as prioritizing certain documents during certain periods (e.g., tax season) to ensure timely and relevant information is accessible. In some implementations, the immunity factor can prioritize documents that have historically been relevant to a wide range of queries to ensure that evergreen documents (documents that are constantly updated or edited) remain accessible. Documents validated by certain individuals and/or organizations can be assigned an immunity factor to ensure that approved content remains highly ranked. Furthermore, documents containing updates or recent changes in policies or procedures can be given an immunity factor to ensure users are always accessing the most current information. The immunity factor can be applied based on the user's role or access level, ensuring that documents relevant to specific roles (e.g., managers, compliance officers) are prioritized in their search results. In some implementations, the immunity factor can prioritize documents based on geographical relevance to ensure that region-specific information remains prominent for users in those areas.

For example, document A 206 can be ranked first in the semantic similarity ranking 202 due to its high semantic relevance but has an intent 208 of "password policy." Despite this mismatch, document A 206 remains ranked first in the intent ranking 204 because of the immunity factor 210. Document B 206, initially ranked second in the semantic similarity ranking 202, can drop to third in the intent ranking 204 because document B's 206 intent "general password information" does not align as closely with the query. Document C 206, which provides specific steps for resetting a password, can be ranked third in the semantic similarity ranking 202 but moves up to second in the intent ranking 204 due to document C's 206 matching intent "password reset."

Example Methods of Operation of the Intent-Based Data Generation Platform

Figure 3:
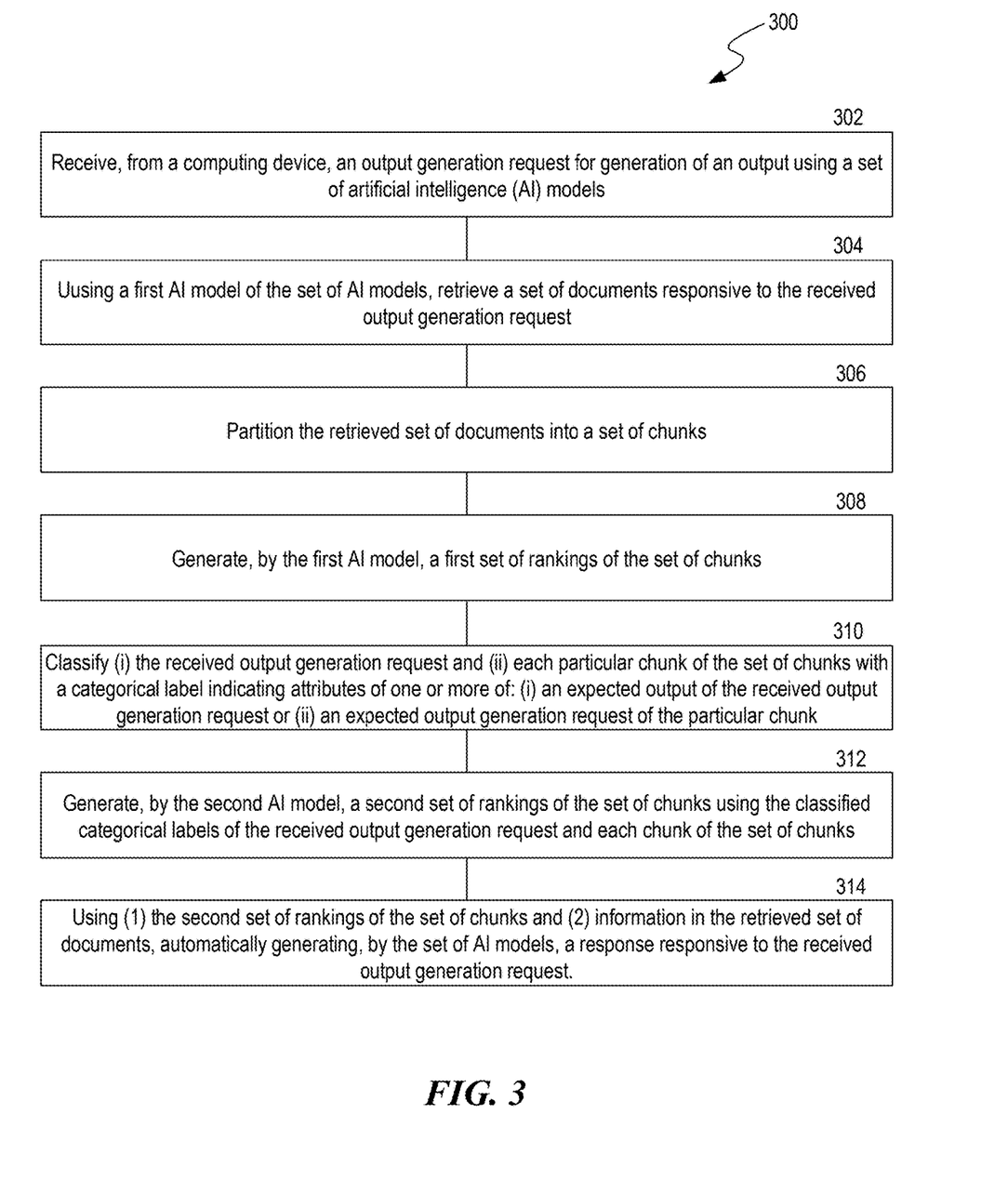
FIG. 3 is a flow diagram illustrating a process of ranking retrieved information of models by intent, in accordance with some implementations of the present technology.

FIG. 3 is a flow diagram illustrating a process 300 of ranking retrieved information of models by intent, in accordance with some implementations of the present technology. In some implementations, the process 300 is performed by components of example devices 500 illustrated and described in more detail with reference to FIG. 5. Particular entities, for example, the set of AI models, are illustrated and described in more detail with reference to classifying model 110 in FIG. 1. Implementations of process 300 can include different and/or additional operations or can perform the operations in different orders.

In operation 302, the intent-based data generation platform 104 can receive, from a computing device, an output generation request (e.g., a user query 102) for generation of an output using a set of AI models. The output generation request can include a prompt (e.g., configured to be input into an LLM). One or more AI models in the set of AI models can be an LLM. In operation 304, using a first AI model of the set of AI models, the intent-based data generation platform 104 can retrieve a set of documents responsive to the received output generation request. For example, the intent-based data generation platform 104 can use inverted indexing and/or TF-IDF to rank documents based on their relevance to the output generation request by identifying and indexing the terms within the query and the documents. Inverted indexing enables the intent-based data generation platform 104 to locate documents containing the output generation request terms by creating a mapping from terms to the documents in which they appear. An inverted index is a data structure that stores a list of occurrences of each term across all documents. Meanwhile, TF-IDF a statistical measure used to evaluate how relevant a word is to a document in a collection of documents. The intent-based data generation platform 104 can calculate the term frequency (TF) to determine how often the output generation request terms appear in each document and the inverse document frequency (IDF) to assess the rarity of the terms across the entire document corpus. By multiplying these values, TF-IDF can assign higher scores to documents that contain the output generation request terms frequently but are not common across many documents.

In some implementations, the intent-based data generation platform 104 is enabled to intake different modalities of output generation requests (e.g., natural language text, images, videos, audio files) and/or multi-modality output generation requests. For natural language text queries, the intent-based data generation platform 104 can use NLP techniques to parse the text to extract the keywords and/or entities from the output generation request. Techniques such as tokenization and/or syntactic parsing can be used to break down the output generation request into its constituent parts and identify the relationships between them. Tokenization can break the output generation request into smaller units (i.e., tokens). For example, the output generation request can include a prompt, "How can I reset my password?" and be tokenized into individual words: "How", "can", "I", "reset", "my", and "password." Syntactic parsing can evaluate the grammatical structure of the text, identifying parts of speech and their relationships. In the above example, "How" is an adverb, "can" is a modal verb, "I" is a pronoun, "reset" is a verb, "my" is a possessive pronoun, and "password" is a noun, which allows the intent-based data generation platform 104 to identify the grammatical relationships, such as "I" being the subject and "reset" being the action. The intent-based data generation platform 104 can generate a structured representation of the output generation request, that captures the keywords and/or entities and their relationships. The structured representation of the query (e.g., SQL command, JSON format) can be used to search a database and retrieve a set of documents or information (e.g., document retrieval engine 106) using a corresponding database client or application programming interface (API) to send the query and retrieve the resulting documents.

For images within the output generation request, the intent-based data generation platform 104 can perform feature extraction using pre-trained CNNs. The extracted feature vectors can be indexed in a database (e.g., a vector database) for subsequent similarity searches. When a query is received, the intent-based data generation platform 104 can extract the feature vector of the query image using the same CNN model and transformations, and performs a similarity search using metrics like cosine similarity or Euclidean distance to find similar images in the database. For videos within the output generation request, the intent-based data generation platform 104 can extract frames at regular intervals and uses a pre-trained CNN to extract feature vectors from each frame. These features can be aggregated over time using Recurrent Neural Networks (RNNs) or 3D CNNs. The aggregated features can be indexed in a database, and for a given query, the intent-based data generation platform 104 can extract and aggregate features from the query video in the same manner as that of an image output generation request, performing a similarity search to retrieve relevant videos. For audio, the intent-based data generation platform 104 can use techniques such as Mel-frequency cepstral coefficients (MFCCs) or spectrograms to extract features (e.g., pitch, formants, zero-crossing rates) from audio signals. The features can be indexed in a database, and for a given query, the intent-based data generation platform 104 can use the extracted features from the query audio to perform a similarity search to map audio files. Multi-modal output generation requests, which can include a combination of text, images, videos, and/or audio, can be separated by the mode, and the intent-based data generation platform 104 can extract and index features from each modality separately. For a given query, the intent-based data generation platform 104 can extract features from each modality, combine them into representative vectors (e.g., weighing each modality equally or differently), and perform a similarity search to retrieve relevant multi-modal documents.

In operation 306, the intent-based data generation platform 104 can partition the retrieved set of documents into a set of chunks. Each chunk of the set of chunks can satisfy a set of predetermined criteria (e.g., a predefined size threshold). For example, a size of each chunk can be determined using a predetermined number of words, sentences, and/or paragraphs within the set of documents. For instance, a chunk can be limited to 500 words or 5 paragraphs. Once the criteria are established, the intent-based data generation platform 104 tokenizes the documents into smaller units based on the chosen criteria. If the chunking is to be done by sentences, a sentence tokenizer can be used to split the document into individual sentences. Similarly, if chunking by words, a word tokenizer can be used. After tokenization, the intent-based data generation platform 104 can partition the documents into chunks according to the predefined criteria. For example, if chunking by sentences with a maximum chunk size of 5 sentences, the sentences are grouped into chunks of 5.

In some implementations, the predefined criteria is associated with the type of content of each chunk, where each subsequent chunk of the set of chunks can include a different type of content from a previous chunk appearing prior to the subsequent chunk in the retrieved set of documents. The types of content can be differentiated based upon, for example, modality, context, topic, and so forth. In some implementations, the system can segment the retrieved documents into semantically meaningful chunks. For example, each chunk can be tailored to encapsulate a specific idea or topic, even when the idea is found in different portions of the document (e.g., the beginning and end). The intent-based data generation platform 104 can identify and categorize different topics within the documents using, for example, topic modeling, to detect and label distinct topics within the documents. Once the topics are identified and categorized, the intent-based data generation platform 104 can partition the documents into chunks where each subsequent chunk covers a different topic from the previous chunk (e.g., by maintaining a sequence of topics and ensuring that the topic of the current chunk is different from that of one or more previous chunks). For example, if the first chunk discusses "password reset," the platform ensures that the next chunk covers a different topic, such as "password policies." The intent-based data generation platform 104 can use a loop to iterate through the categorized content, creating chunks containing the same topic. If the next piece of content is on the same topic as the previous chunk, the intent-based data generation platform 104 can adjust the chunk size to include content from the piece of content.

In operation 308, the intent-based data generation platform 104 can generate, by the first AI model, a first set of rankings of the set of chunks. For example, the intent-based data generation platform 104 can generate a set of vector representations of (i) the received output generation request and/or (ii) each chunk of the set of chunks of the retrieved set of documents. The intent-based data generation platform 104 can use a pre-trained transformer-based model, such as Bidirectional Encoder Representations from Transformers (BERT) or Generative Pre-trained Transformer (GPT). The chunks can be fed into the AI model to produce vector representations.

For each particular chunk in the set of chunks, the intent-based data generation platform 104 can determine a distance metric value between the vector representation of the received output generation request and the vector representation of the particular chunk to measure the similarity/dissimilarity of the vectors. Distance metrics can include Euclidean distance, which measures the straight-line distance between two points in the vector space. In some implementations, the distance metric value between the vector representation of the received output generation request and the vector representation of each chunk is determined using a cosine angle between the vector representation of the received output generation request and the vector representation of each chunk. The intent-based data generation platform 104 can use the determined distance metric value between the vector representation of the received output generation request and the vector representation of the particular chunk to assign the particular chunk a ranking within the first set of rankings. Chunks with vector representations that are closer to the vector representation of the output generation request or have a higher cosine similarity (indicating higher relevance) receive higher rankings. Conversely, chunks with vector representations that are farther away receive lower rankings.

In operation 310, using a second AI model of the set of AI models, the intent-based data generation platform 104 can classify (i) the received output generation request and (ii) each particular chunk of the set of chunks with a categorical label (e.g., intent) indicating attributes of one or more of: (i) an expected output of the received output generation request or (ii) an expected output generation request of the particular chunk. In some implementations, the second AI model classifies the received output generation request using: (i) a text within the received output generation request and (ii) a pre-loaded query context within the received output generation request. In some implementations, the categorical labels are from a predefined group of categorical labels. These labels represent, for example, various possible intents, such as "summary," "analysis," or "recommendation." In some implementations, the LLM identifies the categorical labels using a sample of the set of documents. Once the categorical labels are identified for the sample, they can be extrapolated to the broader document set to enable the LLM to categorize large volumes of documents using lower system resources.

The second AI model can use a pre-trained transformer-based architecture, such as BERT or GPT, that has been tuned on a labeled dataset containing examples of text and their corresponding categorical labels to identify the associations between specific phrases, keywords, and the overall context of the text with the predefined labels. In some implementations, the second AI model can generate a vector representation that captures the semantic meaning of the text. For instance, in BERT, the input text is tokenized and passed through multiple transformer layers, where self-attention mechanisms compute the relationships between tokens. The output is a contextualized vector representation of the text. The vector can be mapped, in a classification layer of the second AI model, to one or more of the predefined categorical labels. The classification layer can assign probabilities to each label indicating the likelihood that the text corresponds to each possible intent (e.g., using softmax activation functions). The label with the highest probability can be selected as the classification result. The model can further refine its identification of potential categories by using additional contextual information, such as metadata indicating the document's source or historical data on similar queries.

In some implementations, RNNs, including their variants such as Long Short-Term Memory (LSTM), are used to classify text based on intent. RNNs trained on a labeled dataset containing examples of text and their corresponding intents can capture temporal dependencies in the request/chunks by maintaining a hidden state that is updated at each time step, allowing the model to retain information about previous inputs in the sequence. The hidden state is a vector that serves as the memory of the network, capturing information about previous inputs in the sequence. At each time step, the RNN can process an input token (e.g., a word or character) and updates its hidden state based on the current input and the previous hidden state. The update can be governed by a set of learned weights and activation functions. The final hidden state can be passed through a fully connected (i.e., dense) layer to assign probabilities to each intent (e.g., using a softmax activation function). The intent with the highest probability can be selected as the classification result.

Similarly, the intent-based data generation platform 104 can, in some implementations, use Convolutional Neural Networks (CNNs) to assign to classify text based on intent. For example, the CNN can convert the text data into word embeddings using pre-trained models such as Word2Vec or GloVe to transform words or phrases into dense vector representations. The word embeddings can be fed into the CNN, where convolutional layers apply filters to extract local features from the text (e.g., by detecting patterns such as n-grams or specific word combinations that are indicative of certain intents). The output of the convolutional layers can be passed through pooling layers, which down-sample the feature maps to reduce dimensionality. The resulting feature maps can be flattened and passed through one or more fully connected (dense) layers. Similarly to RNNs, a softmax activation function can be applied to assign probabilities to each possible intent, and the intent with the highest probability can be selected as the classification result.

In some implementations, the intent-based data generation platform 104 can classify one or more chunks of the set of chunks with multiple categorical labels (e.g., using all labels above a certain confidence threshold). The intent-based data generation platform 104 can generate the ranking of the second set of rankings of the one or more chunks using a weighted sum of the multiple categorical labels. Chunks with higher weighted sums are ranked higher, and can indicate greater relevance to the request. In some implementations, the second AI model classifies the received output generation request using a majority vote between at least two AI models of the set of AI models. Each AI model in the ensemble independently classifies the output generation request, and the final classification is determined by a majority vote. The categorical label assigned to the request can be the one that is most frequently chosen by the individual models. For example, if three AI models are used in the ensemble, and two of them classify the request as "password generation" while the third classifies it as "security advice," the majority vote would result in the request being labeled as "password generation." This approach helps to mitigate the impact of any individual model's biases or errors, leading to more reliable and accurate classifications.

In some implementations, the intent-based data generation platform 104 can cluster similar chunks or queries using clustering algorithms such as K-means, hierarchical clustering, and/or DBSCAN to organize the documents into distinct groups based on the documents' semantic similarity. Each cluster can represent a group of chunks or queries that share common characteristics. For each cluster, the categorical label is identified by determining, for example, a common intent that can be assigned to the entire cluster. For example, during runtime, when a new text (query, chunk, document) is received and the text is not pre-labeled, the intent-based data generation platform 104 can embed the text into the pre-clustered vector space using techniques such as TF-IDF, word embeddings, or sentence embeddings. The new text is then labeled according to the cluster the text is closest to (e.g., determined by the proximity to the cluster's center).

In operation 312, the intent-based data generation platform 104 can generate, by the second AI model, a second set of rankings of the set of chunks using the classified categorical labels of the received output generation request and each chunk of the set of chunks. To generate the rankings, the second AI model compares the categorical label of the received output generation request with the categorical labels of each chunk. For example, chunks with categorical labels matching (or above a certain degree of aligning with) the categorical label of the received output generation request can be ranked higher than chunks with categorical labels failing to match the categorical label of the received output generation request. The degree of alignment can be quantified using similarity scores or alignment metrics, which measure how well the categorical labels correspond to each other. For instance, a chunk labeled as "summary" can be highly relevant to a request also labeled as "summary," resulting in a high similarity score. The second AI model can sort the chunks based on these similarity scores, creating a ranked list where the most relevant chunks appear at the top. Chunks with categorical labels that fail to match or align closely with the label of the request receive lower similarity scores and are ranked lower in the list. Additionally, the second AI model can incorporate thresholds or degrees of alignment. For example, chunks that align above a certain threshold with the request's categorical label can be given higher priority, while those below the threshold are deprioritized.

In operation 314, using the second set of rankings of the set of chunks and information in the retrieved set of documents, the intent-based data generation platform 104 can automatically generate, by the set of AI models, a response responsive to the received output generation request. For example, the intent-based data generation platform 104 can determine one or more chunks of the set of chunks with a rank within the second set of rankings above a predefined rank threshold, and the response can include a summary of the one or more chunks. The response can be configured to be displayed on a user interface of the computing device.

In some implementations, responsive to one or more chunks of the set of chunks satisfying a set of predefined criteria, the intent-based data generation platform 104 can apply an immunity factor to the one or more chunks. The immunity factor can prevent the ranking of the one or more chunks in the second set of rankings from being lower than the ranking of the one or more chunks in the first set of rankings. Further examples of immunity factors are discussed with reference to FIG. 3.

Figure 4:
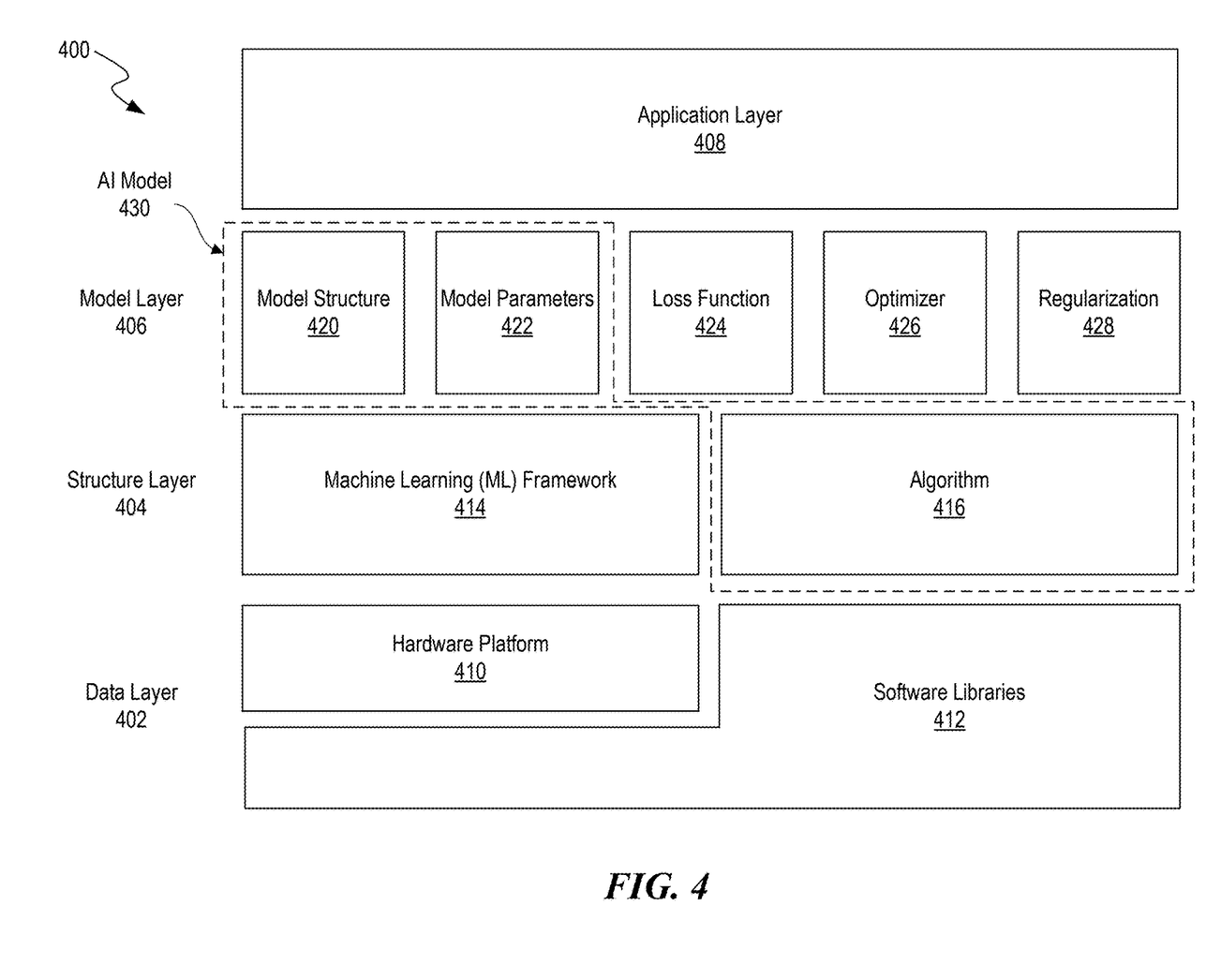
FIG. 4 illustrates a layered architecture of an artificial intelligence (AI) system that can implement the machine learning models of the intent-based data generation platform of FIG. 1, in accordance with some implementations of the present technology.

Example Implementation of the Models of the Intent-Based Data Generation Platform FIG. 4 illustrates a layered architecture of an AI system 400 that can implement the ML models of the intent-based data generation platform 104 of FIG. 1, in accordance with some implementations of the present technology. Example ML models can include the models executed by the intent-based data generation platform 104, such as classifying model 110. Accordingly, the classifying model 110 can include one or more components of the AI system 400.

As shown, the AI system 400 can include a set of layers, which conceptually organize elements within an example network topology for the AI system's architecture to implement a particular AI model. Generally, an AI model is a computer-executable program implemented by the AI system 400 that analyses data to make predictions. Information can pass through each layer of the AI system 400 to generate outputs for the AI model. The layers can include a data layer 402, a structure layer 404, a model layer 406, and an application layer 408. The algorithm 416 of the structure layer 404 and the model structure 420 and model parameters 422 of the model layer 406 together form an example AI model. The optimizer 426, loss function engine 424, and regularization engine 428 work to refine and optimize the AI model, and the data layer 402 provides resources and support for application of the AI model by the application layer 408.

The data layer 402 acts as the foundation of the AI system 400 by preparing data for the AI model. As shown, the data layer 402 can include two sub-layers: a hardware platform 410 and one or more software libraries 412. The hardware platform 410 can be designed to perform operations for the AI model and include computing resources for storage, memory, logic and networking, such as the resources described in relation to FIGS. 5 and 6. The hardware platform 410 can process amounts of data using one or more servers. The servers can perform backend operations such as matrix calculations, parallel calculations, machine learning (ML) training, and the like. Examples of servers used by the hardware platform 410 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 410 can include computing resources, (e.g., servers, memory, etc.) offered by a cloud services provider. The hardware platform 410 can also include computer memory for storing data about the AI model, application of the AI model, and training data for the AI model. The computer memory can be a form of random-access memory (RAM), such as dynamic RAM, static RAM, and non-volatile RAM.

The software libraries 412 can be thought of suites of data and programming code, including executables, used to control the computing resources of the hardware platform 410. The programming code can include low-level primitives (e.g., fundamental language elements) that form the foundation of one or more low-level programming languages, such that servers of the hardware platform 410 can use the low-level primitives to carry out specific operations. The low-level programming languages do not require much, if any, abstraction from a computing resource's instruction set architecture, enabling them to run quickly with a small memory footprint. Examples of software libraries 412 that can be included in the AI system 400 include INTEL Math Kernel Library, NVIDIA cuDNN, EIGEN, and OpenBLAS.

The structure layer 404 can include an ML framework 414 and an algorithm 416. The ML framework 414 can be thought of as an interface, library, or tool that enables users to build and deploy the AI model. The ML framework 414 can include an open-source library, an API, a gradient-boosting library, an ensemble method, and/or a deep learning toolkit that work with the layers of the AI system facilitate development of the AI model. For example, the ML framework 414 can distribute processes for application or training of the AI model across multiple resources in the hardware platform 410. The ML framework 414 can also include a set of pre-built components that have the functionality to implement and train the AI model and enable users to use pre-built functions and classes to construct and train the AI model. Thus, the ML framework 414 can be used to facilitate data engineering, development, hyperparameter tuning, testing, and training for the AI model. Examples of ML frameworks 414 that can be used in the AI system 400 include TENSORFLOW, PYTORCH, SCIKIT-LEARN, KERAS, LightGBM, RANDOM FOREST, and AMAZON WEB SERVICES.

The algorithm 416 can be an organized set of computer-executable operations used to generate output data from a set of input data and can be described using pseudocode. The algorithm 416 can include complex code that enables the computing resources to learn from new input data and create new/modified outputs based on what was learned. In some implementations, the algorithm 416 can build the AI model through being trained while running computing resources of the hardware platform 410. This training enables the algorithm 416 to make predictions or decisions without being explicitly programmed to do so. Once trained, the algorithm 416 can run at the computing resources as part of the AI model to make predictions or decisions, improve computing resource performance, or perform tasks. The algorithm 416 can be trained using supervised learning, unsupervised learning, semi-supervised learning, and/or reinforcement learning.

Using supervised learning, the algorithm 416 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of user query 102 in FIG. 1) from various source computing systems described in relation to FIG. 1. Furthermore, training data can include pre-processed data generated by various engines of the intent-based data generation platform 104 described in relation to FIG. 1. The user may label the training data based on one or more classes and trains the AI model by inputting the training data to the algorithm 416. The algorithm determines how to label the new data based on the labeled training data. The user can facilitate collection, labeling, and/or input via the ML framework 414. In some instances, the user may convert the training data to a set of feature vectors for input to the algorithm 416. Once trained, the user can test the algorithm 416 on new data to determine if the algorithm 416 is predicting accurate labels for the new data. For example, the user can use cross-validation methods to test the accuracy of the algorithm 416 and retrain the algorithm 416 on new training data if the results of the cross-validation are below an accuracy threshold.

Supervised learning can include classification and/or regression. Classification techniques include teaching the algorithm 416 to identify a category of new observations based on training data and are used when input data for the algorithm 416 is discrete. Said differently, when learning through classification techniques, the algorithm 416 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 416 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 416 is continuous. Regression techniques can be used to train the algorithm 416 to predict or forecast relationships between variables. To train the algorithm 416 using regression techniques, a user can select a regression method for estimating the parameters of the model. The user collects and labels training data that is input to the algorithm 416 such that the algorithm 416 is trained to understand the relationship between data features and the dependent variable(s). Once trained, the algorithm 416 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 416 learns patterns from unlabeled training data. In particular, the algorithm 416 is trained to learn hidden patterns and insights of input data, which can be used for data exploration or for generating new data. Here, the algorithm 416 does not have a predefined output, unlike the labels output when the algorithm 416 is trained using supervised learning. Said another way, unsupervised learning is used to train the algorithm 416 to find an underlying structure of a set of data, group the data according to similarities, and represent that set of data in a compressed format. The intent-based data generation platform 104 can use unsupervised learning to identify patterns in claim history (e.g., to identify particular event sequences) and so forth. In some implementations, performance of the classifying model 110 that can use unsupervised learning is improved because the incoming user query 102 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 416 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 416 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 416 include factor analysis, item response theory, latent profile analysis, and latent class analysis.

The model layer 406 implements the AI model using data from the data layer and the algorithm 416 and ML framework 414 from the structure layer 404, thus enabling decision-making capabilities of the AI system 400. The model layer 406 includes a model structure 420, model parameters 422, a loss function engine 424, an optimizer 426, and a regularization engine 428.

The model structure 420 describes the architecture of the AI model of the AI system 400. The model structure 420 defines the complexity of the pattern/relationship that the AI model expresses. Examples of structures that can be used as the model structure 420 include decision trees, support vector machines, regression analyses, Bayesian networks, Gaussian processes, genetic algorithms, and artificial neural networks (or, simply, neural networks). The model structure 420 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 420 may include one or more hidden layers of nodes between the input and output layers. The model structure 420 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 422 represent the relationships learned during training and can be used to make predictions and decisions based on input data. The model parameters 422 can weight and bias the nodes and connections of the model structure 420. For instance, when the model structure 420 is a neural network, the model parameters 422 can weight and bias the nodes in each layer of the neural networks, such that the weights determine the strength of the nodes and the biases determine the thresholds for the activation functions of each node. The model parameters 422, in conjunction with the activation functions of the nodes, determine how input data is transformed into desired outputs. The model parameters 422 can be determined and/or altered during training of the algorithm 416.

The loss function engine 424 can determine a loss function, which is a metric used to evaluate the AI model's performance during training. For instance, the loss function engine 424 can measure the difference between a predicted output of the AI model and the actual output of the AI model and is used to guide optimization of the AI model during training to minimize the loss function. The loss function may be presented via the ML framework 414, such that a user can determine whether to retrain or otherwise alter the algorithm 416 if the loss function is over a threshold. In some instances, the algorithm 416 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 426 adjusts the model parameters 422 to minimize the loss function during training of the algorithm 416. In other words, the optimizer 426 uses the loss function generated by the loss function engine 424 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 426 used may be determined based on the type of model structure 420 and the size of data and the computing resources available in the data layer 402.

The regularization engine 428 executes regularization operations. Regularization is a technique that prevents over- and under-fitting of the AI model. Overfitting occurs when the algorithm 416 is overly complex and too adapted to the training data, which can result in poor performance of the AI model. Underfitting occurs when the algorithm 416 is unable to recognize even basic patterns from the training data such that it cannot perform well on training data or on validation data. The optimizer 426 can apply one or more regularization techniques to fit the algorithm 416 to the training data properly, which helps constraint the resulting AI model and improves its ability for generalized application. Examples of regularization techniques include lasso (L1) regularization, ridge (L2) regularization, and elastic (L1 and L2 regularization).

The application layer 408 describes how the AI system 400 is used to solve problem or perform tasks. In an example implementation, the application layer 408 can include a front-end user interface of the intent-based data generation platform 104.

Example Computing Environment of the Intent-Based Data Generation Platform

Figure 5:
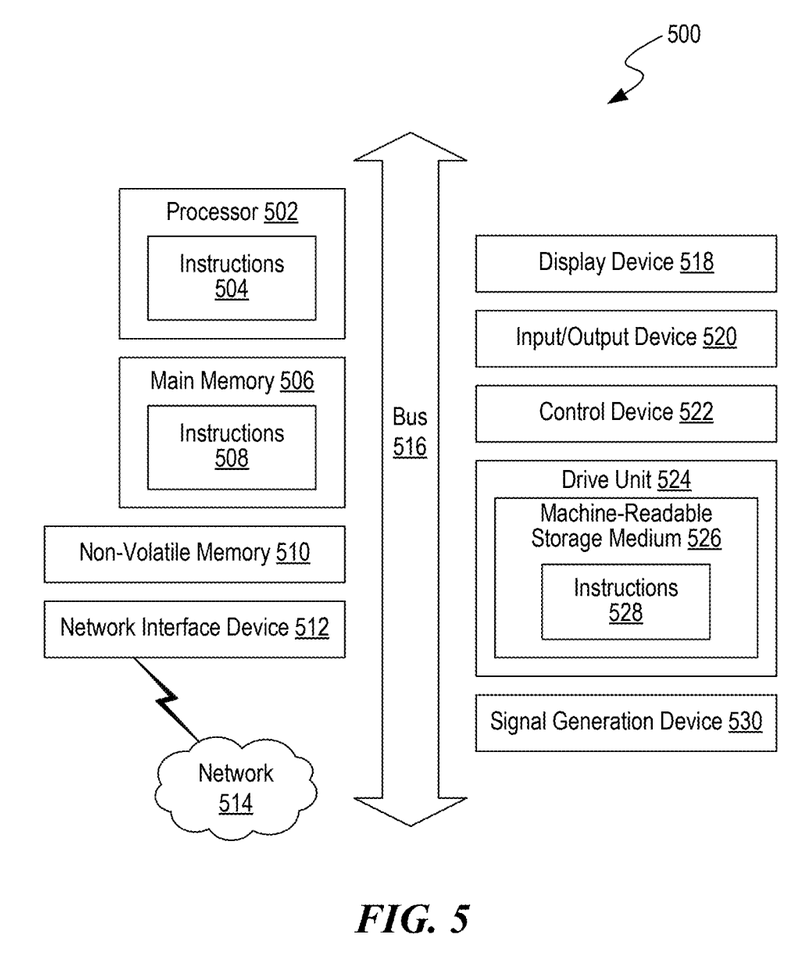
FIG. 5 is a block diagram showing some of the components typically incorporated in at least some of the computer systems and other devices on which the intent-based data generation platform operates in accordance with some implementations of the present technology.

FIG. 5 is a block diagram showing some of the components typically incorporated in at least some of the computer systems and other devices 500 on which the disclosed system operates in accordance with some implementations of the present technology. As shown, an example computer system 500 can include: one or more processors 502, main memory 508, non-volatile memory 512, a network interface device 514, video display device 520, an input/output device 522, a control device 524 (e.g., keyboard and pointing device), a drive unit 526 that includes a machine-readable medium 528, and a signal generation device 532 that are communicatively connected to a bus 518. The bus 518 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computer system 500 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 500. In some implementations, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 514 enables the computer system 500 to exchange data in a network 516 with an entity that is external to the computing system 500 through any communication protocol supported by the computer system 500 and the external entity. Examples of the network interface device 514 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 508, non-volatile memory 512, machine-readable medium 528) can be local, remote, or distributed. Although shown as a single medium, the machine-readable medium 528 can include multiple media (e.g., a centralized/distributed database and/or associated caches and servers) that store one or more sets of instructions 530. The machine-readable (storage) medium 528 can include any medium that is capable of storing, encoding, or carrying a set of instructions for execution by the computer system 500. The machine-readable medium 528 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 510, 530) set at various times in various memory and storage devices in computing device(s). When read and executed by the processor 502, the instruction(s) cause the computer system 500 to perform operations to execute elements involving the various aspects of the disclosure.

Figure 6:
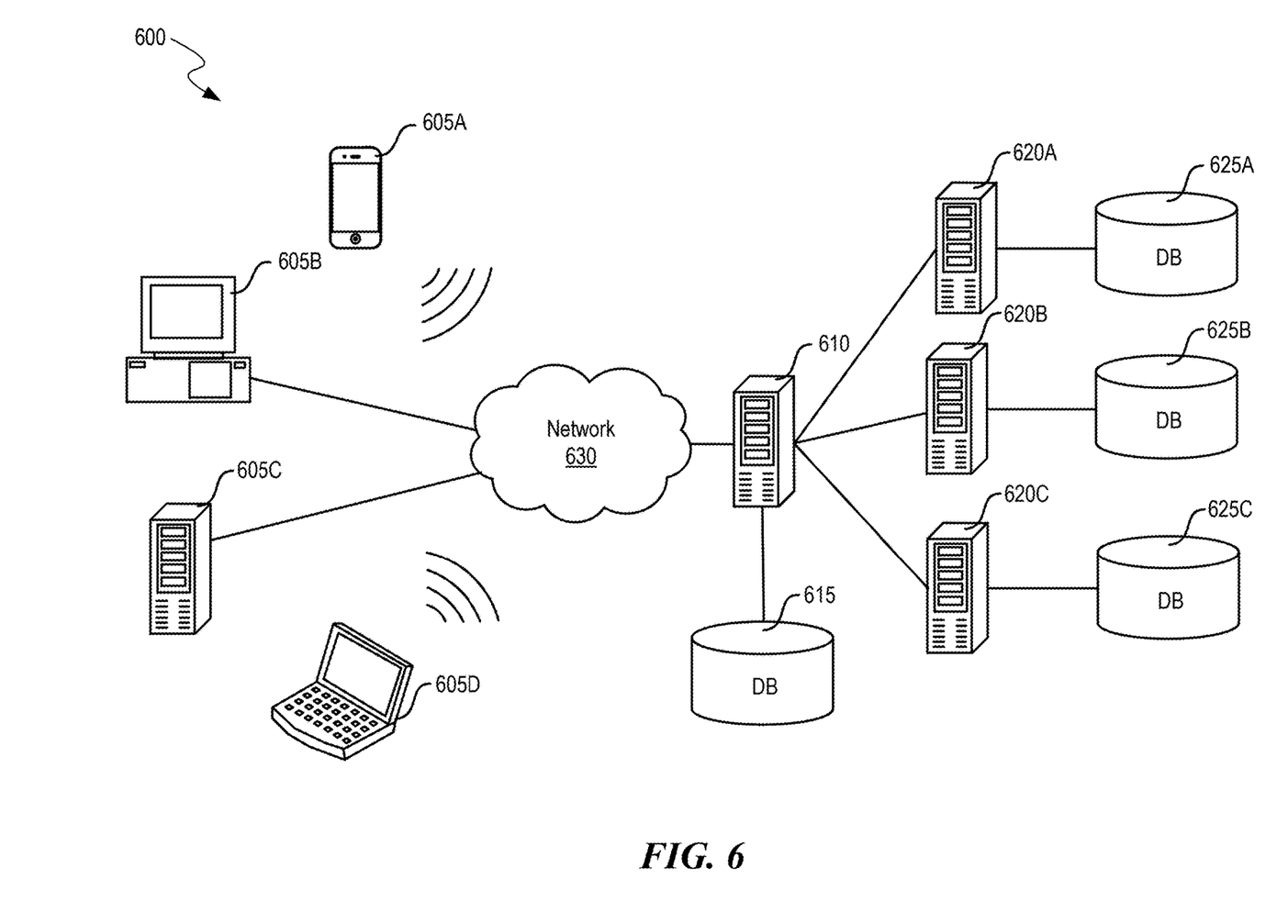
FIG. 6 is a system diagram illustrating an example of a computing environment in which the intent-based data generation platform operates in some implementations of the present technology.

FIG. 6 is a system diagram illustrating an example of a computing environment in which the disclosed system operates in some implementations. In some implementations, environment 600 includes one or more client computing devices 605A-D, examples of which can host the intent-based data generation platform 104 of FIG. 1. Client computing devices 605 operate in a networked environment using logical connections through network 630 to one or more remote computers, such as a server computing device.

In some implementations, server 610 is an edge server which receives client requests and coordinates fulfillment of those requests through other servers, such as servers 620A-C. In some implementations, server computing devices 610 and 620 comprise computing systems, such as the intent-based data generation platform 104 of FIG. 1. Though each server computing device 610 and 620 is displayed logically as a single server, server computing devices can each be a distributed computing environment encompassing multiple computing devices located at the same or at geographically disparate physical locations. In some implementations, each server 620 corresponds to a group of servers.

Client computing devices 605 and server computing devices 610 and 620 can each act as a server or client to other server or client devices. In some implementations, servers (610, 620A-C) connect to a corresponding database (615, 625A-C). As discussed above, each server 620 can correspond to a group of servers, and each of these servers can share a database or can have its own database. Databases 615 and 625 warehouse (e.g., store) information such as claims data, email data, call transcripts, call logs, policy data and so on. Though databases 615 and 625 are displayed logically as single units, databases 615 and 625 can each be a distributed computing environment encompassing multiple computing devices, can be located within their corresponding server, or can be located at the same or at geographically disparate physical locations.

Network 630 can be a local area network (LAN) or a wide area network (WAN), but can also be other wired or wireless networks. In some implementations, network 630 is the Internet or some other public or private network. Client computing devices 605 are connected to network 630 through a network interface, such as by wired or wireless communication. While the connections between server 610 and servers 620 are shown as separate connections, these connections can be any kind of local, wide area, wired, or wireless network, including network 630 or a separate public or private network.

Conclusion

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A computer-implemented method for causing artificial intelligence (AI) models to generate outputs using intent-based rankings of retrieved information, the computer-implemented method comprising:
   obtaining (i) an output generation request for generation of an output using one or more AI models and (ii) one or more sets of information from one or more stored computer files,
      wherein the one or more sets of information is responsive to the obtained output generation request;
   generating, using a first AI model, a first set of rankings of each set of information of the one or more sets of information by associating each particular set of information with one or more indicators of the obtained output generation request;
   classifying, with a set of categorical labels, both (i) the obtained output generation request and (ii) each particular set of information of the one or more sets of information, the set of categorical labels indicating attributes of one or more of: (i) an expected output of the obtained output generation request or (ii) an expected output generation request that results in the particular set of information;
   generating, using a second AI model, a second set of rankings of each set of information of the one or more sets of information using (i) the classified set of categorical labels of the obtained output generation request and (ii) the classified set of categorical labels of each set of information of the one or more sets of information; and
   using the second set of rankings of the one or more sets of information, causing a generation of one or more outputs responsive to the obtained output generation request.

2. The method of claim 1, wherein the first AI model and the second AI model are the same.

3. The method of claim 1, wherein the first AI model and the second AI model are different.

4. The method of claim 1, further comprising:
   generating a confidence score for each set of information of the one or more sets of information using the second set of rankings; and
   filtering out sets of information having a corresponding confidence score satisfying a predetermined threshold.

5. The method of claim 1, further comprising:
   receiving a set of feedback data indicating an accuracy of a generated one or more outputs caused by the generation of the one or more outputs; and
   adjusting the second set of rankings using the received set of feedback data.

6. The method of claim 1,
   wherein the one or more indicators include vector representations of text content within each set of information, and
   wherein generating the first set of rankings comprises:
      comparing vector representations of the output generation request with the vector representations of text content, and
      ranking the sets of information using the comparison.

7. A system comprising:
   at least one hardware processor; and
   at least one non-transitory memory storing instructions, which, when executed by the at least one hardware processor, cause the system to:

obtain (i) an output generation request for generation of an output using one or more AI models and (ii) one or more sets of information from one or more computer files,
  wherein the one or more sets of information is responsive to the obtained output generation request;
determine, using a first AI model, a first set of rankings of each set of information of the one or more sets of information by associating each particular set of information with one or more indicators of the obtained output generation request;
classify, with a set of categorical labels, one or more of: (i) the obtained output generation request or (ii) each particular set of information of the one or more sets of information, the set of categorical labels indicating attributes of one or more of: (i) an expected output of the obtained output generation request or (ii) an expected output generation request associated with the particular set of information;
determine, using a second AI model, a second set of rankings of each set of information of the one or more sets of information using the one or more of: (i) the classified set of categorical labels of the obtained output generation request or (ii) the classified set of categorical labels of each set of information of the one or more sets of information; and
using the second set of rankings of the one or more sets of information, cause a generation of one or more outputs responsive to the obtained output generation request.

8. The system of claim 7, wherein the system is further caused to:
generate a confidence score for each set of information of the one or more sets of information using the second set of rankings; and
filter out sets of information having a corresponding confidence score satisfying a predetermined threshold.

9. The system of claim 7, wherein the classification of the one or more of: (i) the obtained output generation request or (ii) each particular set of information of the one or more sets of information with the set of categorical labels is performed by a third AI model.

10. The system of claim 9, wherein the first AI model, the second AI model, and the third AI model are the same.

11. The system of claim 9, wherein the first AI model, the second AI model, and the third AI model are different.

12. The system of claim 7, wherein, when the second set of rankings are determined at least partly using the classified set of categorical labels of the obtained output generation request, sets of information with categorical labels matching the categorical label of the obtained output generation request are ranked higher than sets of information with categorical labels failing to match the categorical label of the obtained output generation request.

13. The system of claim 7, wherein the system is further caused to:
partition the obtained sets of information into a set of chunks,
wherein a size of each chunk in the set of chunks is smaller than a size of the obtained sets of information.

14. One or more non-transitory, computer-readable media comprising instructions that, when executed by one or more processors, cause operations comprising:
obtaining (i) an output generation request for generation of an output using a set of AI models and (ii) one or more sets of information responsive to the obtained output generation request;
classifying, with a set of categorical labels, one or more of: (i) the obtained output generation request or (ii) each particular set of information of the one or more sets of information, the set of categorical labels indicating attributes of one or more of: (i) an expected output of the obtained output generation request or (ii) an expected output generation request associated with the particular set of information;
determining, using one or more AI models of the set of AI models, a set of rankings of each set of information of the one or more sets of information using the one or more of: (i) the classified set of categorical labels of the obtained output generation request or (ii) the classified set of categorical labels of each set of information of the one or more sets of information; and
using the set of rankings of the one or more sets of information, causing a generation of a set of outputs responsive to the obtained output generation request.

15. The one or more non-transitory, computer-readable media of claim 14, wherein the operations further comprise:
comparing a set of vector representations of the output generation request with a set of vector representations of at least one set of information of the sets of information.

16. The one or more non-transitory, computer-readable media of claim 14, wherein the operations further comprise:
extracting keywords from the sets of information and the output generation request;
generating keyword match scores based on matching keywords of the extracted keywords; and
ranking the sets of information using the keyword match scores.

17. The one or more non-transitory, computer-readable media of claim 14, wherein the one or more AI models include multiple AI models.

18. The one or more non-transitory, computer-readable media of claim 17, wherein the multiple AI models classify the obtained output generation request using a majority vote between or among the multiple AI models.

19. The one or more non-transitory, computer-readable media of claim 14, wherein the one or more AI models classify the obtained output generation request using one or more of: (1) a portion of text within the obtained output generation request or (2) a pre-loaded query context within the obtained output generation request.

20. The one or more non-transitory, computer-readable media of claim 14, wherein the operations further comprise:
partitioning the obtained sets of information into a set of semantic chunks.

* * * * *